(12) United States Patent
Strong et al.

(10) Patent No.: US 11,144,041 B2
(45) Date of Patent: Oct. 12, 2021

(54) 3D VISUALIZATIONS OF IN-PROCESS PRODUCTS BASED ON MACHINE TOOL INPUT

(71) Applicant: The Boeing Company, Chicago, IL (US)

(72) Inventors: Robert Stephen Strong, Everett, WA (US); Fredrick C. Rudnick, III, Shoreline, WA (US); Christopher Luis Carpenter, Bothell, WA (US); Michael Honea, Summerville, SC (US); Kyle W. Lehning, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 1726 days.

(21) Appl. No.: 14/533,327

(22) Filed: Nov. 5, 2014

(65) Prior Publication Data
US 2016/0124424 A1 May 5, 2016

(51) Int. Cl.
*G05B 19/418* (2006.01)
(52) U.S. Cl.
CPC . *G05B 19/41885* (2013.01); *G05B 19/41805* (2013.01); *G05B 2219/31466* (2013.01); *G05B 2219/31472* (2013.01); *G05B 2219/32359* (2013.01); *G05B 2219/35318* (2013.01); *Y02P 90/02* (2015.11)
(58) Field of Classification Search
CPC ........ G05B 19/41885; G05B 19/41805; G05B 2219/32359; G05B 2219/35318; G05B 2219/31466; G05B 2219/31472; Y02P 90/04; Y02P 90/02; Y02P 90/26
See application file for complete search history.

(56) References Cited

U.S. PATENT DOCUMENTS

| 2002/0066192 A1* | 6/2002 | Cunningham | G01B 11/002 33/286 |
| 2003/0033041 A1* | 2/2003 | Richey | G05B 19/4097 700/98 |
| 2006/0036756 A1* | 2/2006 | Driemeyer | G06F 17/3089 709/231 |

(Continued)

OTHER PUBLICATIONS

GE Intelligent Platforms, Proficy Real-Time Information Portal. 08.10 GFA-568L, 2010 GE Intelligent Platforms, Inc.

(Continued)

*Primary Examiner* — Charles E Anya
(74) *Attorney, Agent, or Firm* — Duft & Bornsen, PC

(57) ABSTRACT

Systems and methods are provided for creating three dimensional (3D) visualizations of in-process products. One embodiment is an apparatus that includes a controller and an interface. The controller is able to generate a 3D scene depicting ongoing assembly of a product by a machine tool. The scene includes a 3D model of the product and a 3D model of the machine tool, and the 3D models are placed within the scene based on a location of the product and a location of the machine tool. The interface is able to receive an update from the machine tool indicating a 3D placement of a part that has been attached by the machine tool to the product. The controller is also able to acquire a 3D model of the part, to insert the 3D model of the part within the scene based on the 3D placement, and to provide the scene for display to a user.

20 Claims, 6 Drawing Sheets

(56) References Cited

U.S. PATENT DOCUMENTS

| | | | |
|---|---|---|---|
| 2008/0046109 A1* | 2/2008 | Freeman | G01S 5/163 |
| | | | 700/114 |
| 2008/0250832 A1* | 10/2008 | Sanchez-Brunete Alvarez | |
| | | | B21J 15/043 |
| | | | 72/17.3 |
| 2009/0070077 A1* | 3/2009 | Tian | G06T 7/593 |
| | | | 703/1 |
| 2009/0271016 A1* | 10/2009 | Wampler | G05B 19/41845 |
| | | | 700/96 |
| 2009/0326699 A1* | 12/2009 | Coffland | G05B 19/41875 |
| | | | 700/108 |
| 2010/0153073 A1* | 6/2010 | Nagatsuka | G05B 19/4069 |
| | | | 703/1 |
| 2010/0262930 A1* | 10/2010 | Helbling | G06F 17/50 |
| | | | 715/771 |
| 2012/0162210 A1* | 6/2012 | Cabrita | G06T 19/20 |
| | | | 345/419 |
| 2012/0290271 A1* | 11/2012 | Diguet | G06F 17/50 |
| | | | 703/1 |
| 2013/0123983 A1* | 5/2013 | Brogårdh | B25J 9/162 |
| | | | 700/254 |
| 2014/0025192 A1* | 1/2014 | Seya | G05B 19/4063 |
| | | | 700/174 |

OTHER PUBLICATIONS

InfinityQS, ProFicient Features http://www.infinityqs.com/software/proficient-features#monitoringtanalysis.

* cited by examiner

FIG. 6

| JOB NAME | MACHINE ID | DATE-TIME | PROGRAM NAME | LINE | HOLE NAME | STATUS | X | Y | Z | A | B | C |
|---|---|---|---|---|---|---|---|---|---|---|---|---|
| FUSELAGE 1295 | ROBOT1 | 38:44.0 | MCD 1561 | N1671 | HOLE 73962 | SUCCESS | -432.5 | 34.4 | 249.8 | -29.6 | -7.2 | 255 |

3D VISUALIZATIONS OF IN-PROCESS PRODUCTS BASED ON MACHINE TOOL INPUT

FIELD

The disclosure relates to the field of manufacturing, and in particular, to manufacturing systems that utilize machine tools.

BACKGROUND

Machine tools are used to transform basic components and materials into valuable goods. Machine tools accomplish this task by adding or removing materials/parts to a partially manufactured product. For example, within a factory, automated machine tools may be grouped into assembly cells that each apply a different set of physical changes to a product. The product moves from one assembly cell into the next until the product has been completed. Consider an airplane fuselage, which may stop at one assembly cell to have a skin riveted onto its surface, at another assembly cell to have windows mounted into it, etc.

As presently used, machine tools report their progress to monitoring devices, which may utilize the progress information to generate charts, tables, and/or graphs for display to a user. However, in order for assembly issues to be identified and resolved quickly, factories continue to seek out comprehensive, easy-to-comprehend techniques for tracking the progress of a product as it is manufactured. This is particularly relevant with regard to expensive, complex products such as aircraft.

SUMMARY

Embodiments described herein utilize three dimensional (3D) progress information from machine tools in order to create 3D scenes that represent the ongoing assembly of an in-process product being worked on by machine tools. These scenes include 3D models for parts that have been attached to the product, and the 3D models for the parts are placed based on coordinate information received from the machine tools. The 3D scenes enable an operator of a manufacturing center to rapidly ascertain the status of the product as it is being completed, and further enables an operator to quickly and accurately determine the location and nature of manufacturing errors on the product.

One embodiment is an apparatus for creating three dimensional (3D) visualizations of in-process products. The apparatus includes a controller and an interface. The controller is able to generate a 3D scene depicting ongoing assembly of a product by a machine tool. The scene includes a 3D model of the product and a 3D model of the machine tool, and the 3D models are placed within the scene based on a location of the product and a location of the machine tool. The interface is able to receive an update from the machine tool indicating a 3D placement of a part that has been attached by the machine tool to the product. The controller is also able to acquire a 3D model of the part, to insert the 3D model of the part within the scene based on the 3D placement, and to provide the scene for display to a user.

Another embodiment is a method for creating three dimensional (3D) visualizations of in-process products. The method includes generating a three dimensional (3D) scene depicting ongoing assembly of a product by a machine tool. The scene includes a 3D model of the product and a 3D model of the machine tool, and the 3D models are placed within the scene based on a location of the product and a location of the machine tool. The method also includes receiving an update from the machine tool indicating a 3D placement of a part that has been attached by the machine tool to the product, acquiring a 3D model of the part, and inserting the 3D model of the part within the scene based on the 3D placement of the part. The method further includes providing the scene for display to a user.

Another embodiment is an apparatus for facilitating the creation of three dimensional (3D) visualizations of in-process products. The apparatus includes a machine tool able to assemble a product by attaching parts to the product. The machine tool includes a controller able to detect 3D placements of parts that have been attached to the product by the machine tool, and to generate updates that each include a detected 3D placement of a part attached to the product by the machine tool. The machine tool also includes an interface able to transmit the updates to an external device.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 6 is a diagram illustrating an update in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
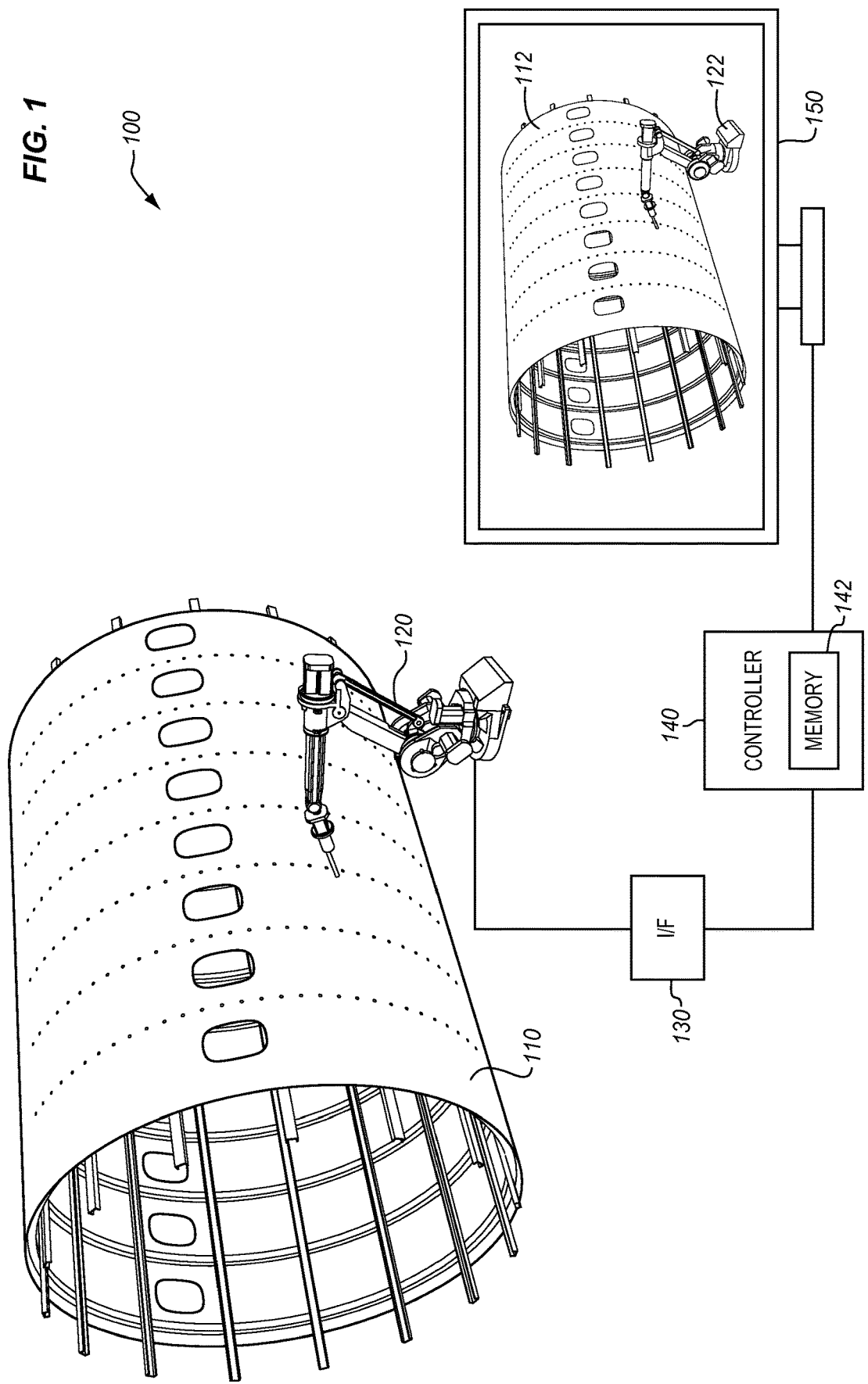
FIG. 1 is a block diagram of a manufacturing system in an exemplary embodiment.

FIG. 1 is a block diagram of a manufacturing system 100 in an exemplary embodiment. In this embodiment, manufacturing system 100 is operating upon product 110 (in this case, an airplane fuselage) in order to assemble product 110. Manufacturing system 100 includes multiple machine tools (e.g., robot arms, lathes, Computer Numerical Control (CNC) machines, punches, etc.) that operate on product 110, and these machine tools are grouped into one or more assembly cells. As used herein, an assembly cell is defined by the set of tools that will position and/or manipulate product 110 while it occupies a single location (e.g., room, corridor, jig, etc.).

In FIG. 1, as machine tool 120 assembles product 110, it transmits 3D placement information (e.g., a position and orientation) for newly added parts to interface (I/F) 130 (e.g., a FireWire interface, an Ethernet interface, a Universal Serial Bus (USB) interface, etc.). This information received at I/F 130 is analyzed by controller 140, which updates display 150 with a 3D scene. The 3D scene depicts a 3D model 112 of product 110, a 3D model 122 of machine tool 120, and the parts that have been added to product 110 during assembly. As used herein, a scene (also known as a "space," a "volume," or a "virtual room") may comprise a set of models arranged in a 3D coordinate space. For example, a scene may comprise a rendered view of multiple 3D models arranged in a manner that mimics the real-world arrangement of machine tools at an assemble cell. In one embodiment, the scene is updated in real time as machine tool 120 assembles product 110. Controller 140 includes memory 142, and may be implemented as custom circuitry, as a processor executing programmed instructions, etc.

Manufacturing system 100 provides a benefit over prior manufacturing systems, because it is capable of updating a dynamic 3D display based on updates from machine tool 120 indicating the actual 3D positions/orientations of parts that have been attached to product 110 on the factory floor. Using 3D models to present the ongoing activities of an assembly cell provides for a better intuitive understanding of manufacturing progress than systems which use 2D drawings. 2D drawings are inferior because they are harder for an operator to precisely interpret. In contrast, using manufacturing system 100, an operator at the factory may determine the completion status of product 110 by glancing at display 150, and may further utilize the 3D scene to rapidly identify the location and nature of manufacturing errors, increasing the speed at which they are corrected.

Illustrative details of the operation of manufacturing system 100 will be discussed with regard to FIG. 2. Assume, for this embodiment, that product 110 has entered a new assembly cell that includes machine tool 120, and that machine tool 120 has started attaching new parts to product 110 (e.g., by mounting windows, attaching sheets of metal to ribbing on product 110 in order to form a skin, etc.).

Figure 2:
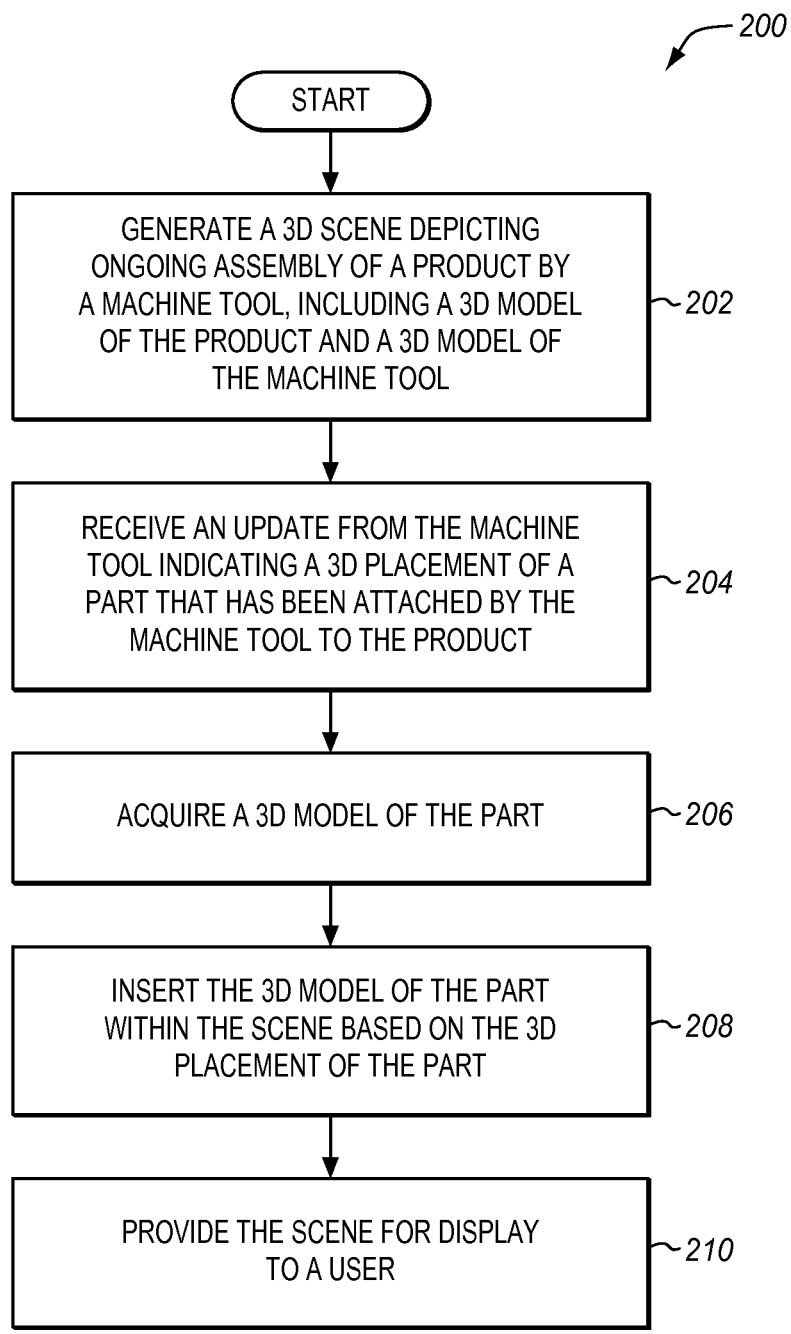
FIG. 2 is a flowchart illustrating a method for monitoring a product as it is being manufactured in an exemplary embodiment.

FIG. 2 is a flowchart illustrating a method 200 for monitoring a product as it is being manufactured in an exemplary embodiment. The steps of method 200 are described with reference to manufacturing system 100 of FIG. 1, but those skilled in the art will appreciate that method 200 may be performed in other systems. The steps of the flowcharts described herein are not all inclusive and may include other steps not shown. The steps described herein may also be performed in an alternative order.

According to FIG. 2, controller 140 generates a 3D scene for display 150 that depicts the ongoing assembly of product 110 (step 202). The scene includes a 3D model of product 110 and a 3D model of machine tool 120 as they are currently positioned/oriented/located within their assembly cell. The 3D models for product 110 and machine tool 120 may be stored in memory at controller 140 or acquired from an external device, while location information for the 3D models for product 110 and machine tool 120 may be pre-programmed into controller 140, reported by machine tool 120, provided by a factory floor operator, etc. With the 3D scene depicted at display 150, a user may determine the current progress of product 110 within the assembly cell.

Machine tool 120 starts to assemble product 110 by attaching parts to product 110. For each attached part, an internal controller at machine tool 120 records a 3D placement indicating how the part was attached to the product. This information is packed by the internal controller into an update, which is transmitted via an interface of machine tool 120 to interface 130. The update therefore may include the 3D location of the part (e.g., an X, Y, and Z position of a point on the part) attached to product 110. The update may further include the orientation of the part (e.g., an angular rotation of the part with respect to the scene, with respect to a 3D model within the scene, etc.) as defined by angles $\theta$, $\Phi$, and $\Psi$.

The update may further include 3D positioning/orientation data for machine tool 120 itself, a success/fail status of an operation performed by machine tool 120 (e.g., "milestones" indicating which parts are successfully installed), etc. The update may even include an amount of force applied by machine tool 120 to attach a part to product 110, a penetration distance of a part attached to product 110 by machine tool 120, a grip length of a fastener inserted into product 110, tolerancing information (e.g., indicating whether a part was attached to product 110 within acceptable limits of position, or indicating a deviation of a part from its expected 3D position and orientation), etc.

In step 204, interface 130 receives the update from machine tool 120, which indicates the 3D placement of the part that has been attached by machine tool 120 to product 110. This information enables controller 140 to update the current scene to depict the part as it has been attached to product 110 in the real world. To this end, controller 140 acquires a 3D model of the part (e.g., from internal memory or a remote server) in step 206.

In step 208, controller 140 inserts the 3D model of the part within the scene based on the 3D placement of the part (e.g., based on a position and orientation indicated in the update). In some embodiments, each update uses a coordinate system local to machine tool 120, while the 3D scene utilizes a different coordinate system. In such embodiments, controller 140 transforms the 3D placement from the coordinate system used by machine tool 120 (e.g., by offset and rotation techniques) to match the coordinate system used by the 3D scene before placing the 3D model for the part. The newly updated scene is then transmitted from controller 140 in step 210 for display to a user, via display 150.

Using the techniques described herein with regard to method 200, an operator on a factory floor may quickly and efficiently utilize the 3D scene provided by controller 140 in order to manage manufacturing operations and evaluate the assembly and/or installation progress of individual products (e.g., in real time). For complex or expensive products that take weeks or months to assemble, this provides a substantial benefit in terms of enhanced production quality and speed.

Figure 3:
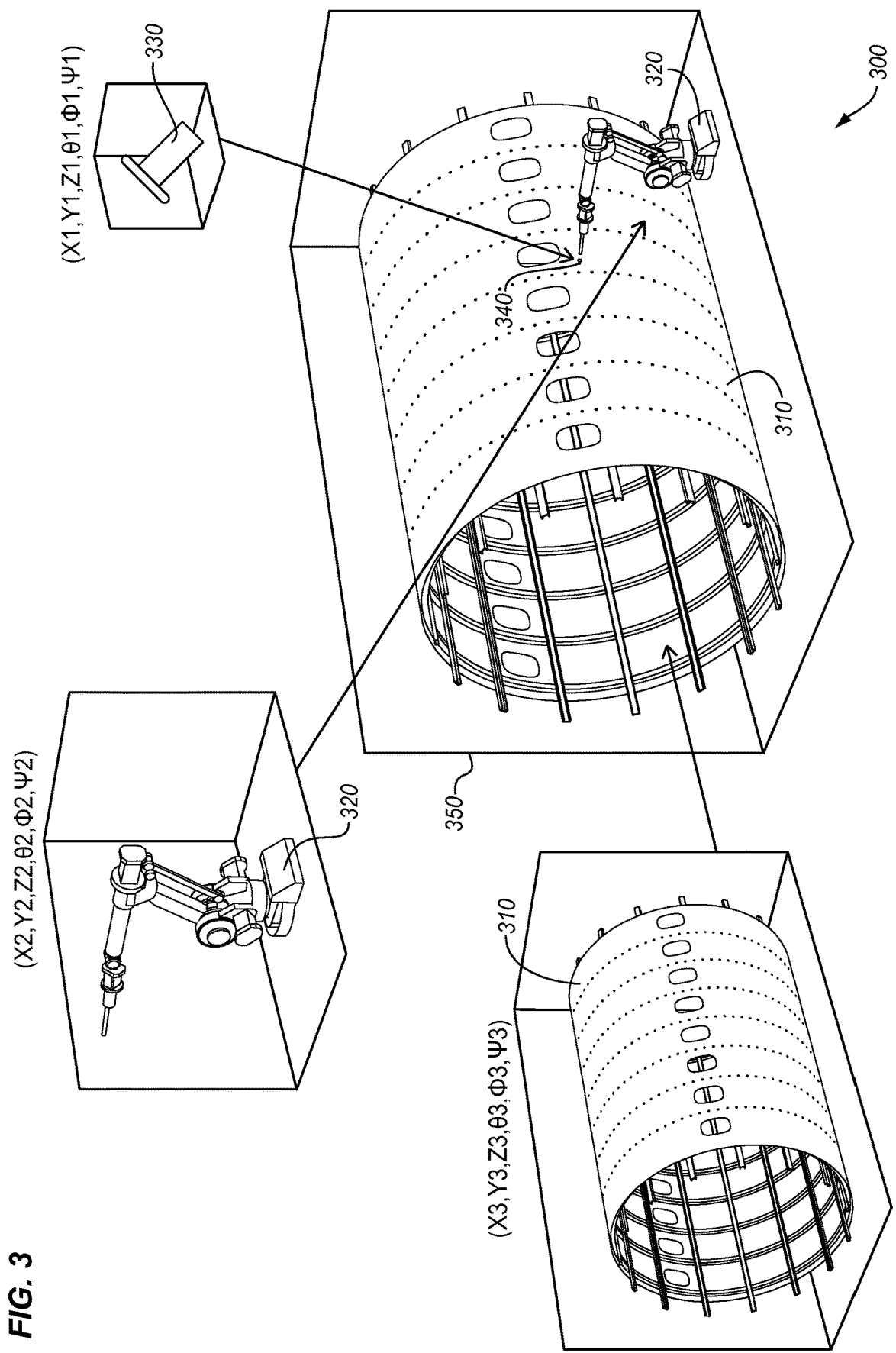
FIG. 3 is a diagram illustrating the creation of a 3D scene in an exemplary embodiment.

FIG. 3 is a diagram 300 illustrating the creation of a 3D scene in an exemplary embodiment. According to FIG. 3, controller 140 loads individual models for product 110, machine tool 120, and a rivet. Specifically, 3D model 310 represents product 110, 3D model 320 represents machine tool 120, and 3D model 330 represents the rivet. Each of these models is oriented and positioned according to an internal coordinate system, meaning that simply overlaying the models on top of each other will not properly represent ongoing manufacturing processes. To this end, controller 140 consults an internal memory to determine how machine tool 120 and product 110 are oriented with respect to each other within an assembly cell. This information comes in the form of six data points for each of machine tool 120 and product 110. The data points for each of machine tool 120 and product 120 indicate their position (X, Y, Z) and orientation (θ, Φ, and Ψ) with respect to each other within the assembly cell. Controller 140 uses this information to create a 3D scene 350 that includes 3D models 310 and 320.

When machine tool 120 applies the rivet to product 110, it reports six data points indicating the position and orientation of the rivet as it was actually driven into product 110. Controller 140 transforms the coordinate system used by machine tool 120 into the coordinate system used by the 3D scene by scaling, rotating, and offsetting 3D model 330. Controller 140 then inserts 3D model 330 at its reported position and orientation within the 3D scene, as shown at element 340.

Figure 4:
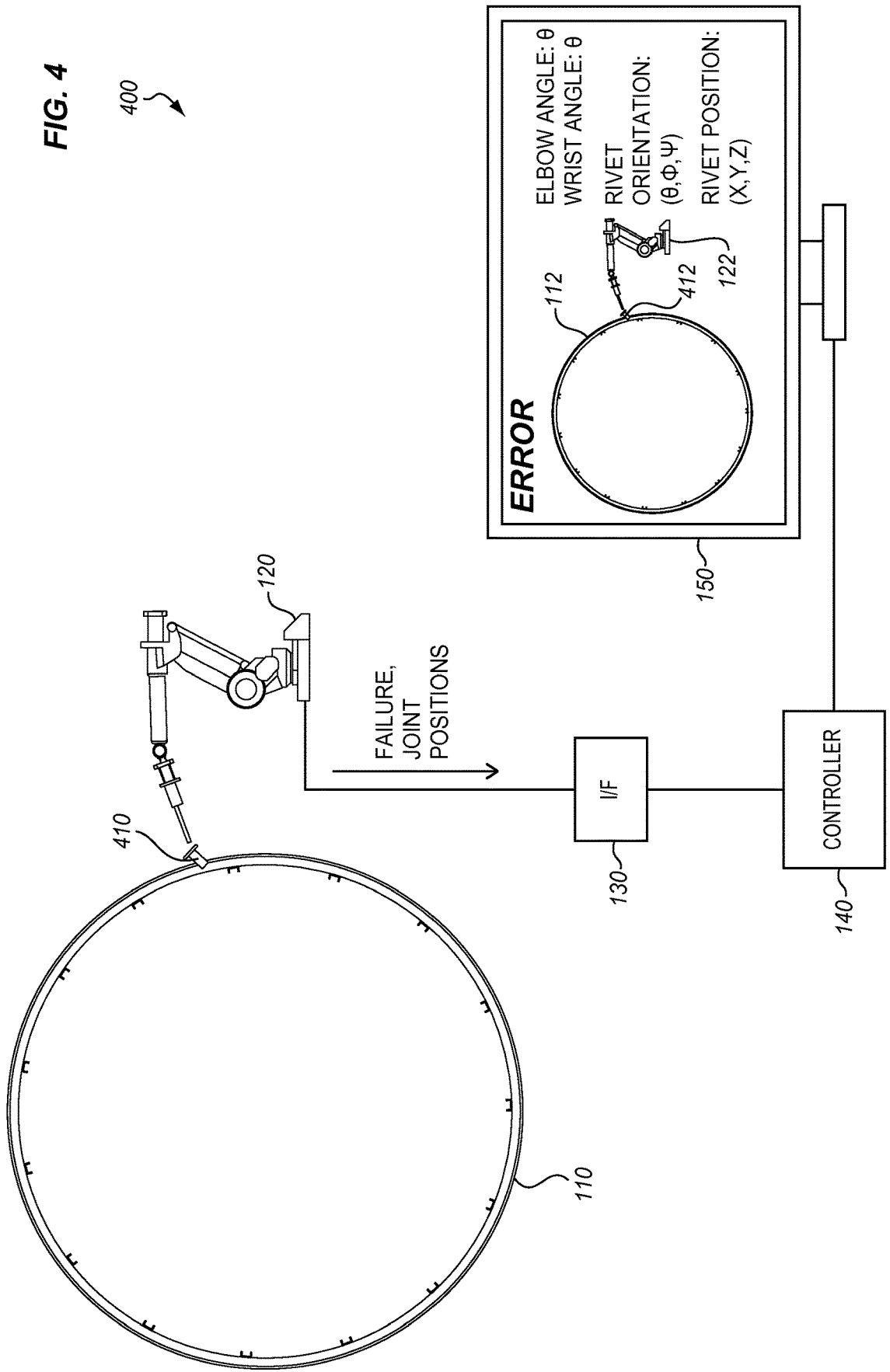
FIG. 4 is a block diagram illustrating detection of a manufacturing error in an exemplary embodiment.

In a further embodiment, a controller is capable of updating a 3D scene to depict the 3D location of manufacturing errors/faults that have an impact on a product. FIG. 4 is a block diagram 400 illustrating the detection of a manufacturing error in an exemplary embodiment. In this embodiment, a part 410 (e.g., a rivet) has been improperly oriented with respect to a surface of product 110, and then attached/mounted to product 110. Machine tool 120 reports the position and orientation of part 110 to controller 140 via interface 130. Controller 140 renders a 3D model 112 of product 110, a 3D model 122 of machine tool 120, and a 3D model 412 of part 410 into a scene. Controller 140 compares the position and orientation of part 410 to an expected position and orientation for part 410, and determines that part 410 has not been installed in its expected location. Controller 140 then loads tolerancing information indicating an acceptable level of variance in position and orientation for part 410. Based on the tolerancing information, controller 140 determines that the installation of part 410 has resulted in a manufacturing error.

Controller 140 may then update the scene in order to actively depict/visualize the detected error (e.g., by showing a position/orientation of machine tool 120 or part 410 during the error, highlighting locations on the scene where the error is located, etc.). Controller 140 may further indicate an error status on display 150, and update the 3D scene to indicate the location and orientation of misplaced part 410. In embodiments where product 110 is very large and part 410 is very small, controller 140 may further highlight, color, or otherwise draw attention to the location in the 3D scene where the error was encountered. A factory operator viewing the 3D scene may then immediately proceed to the exact known 3D location where the error was encountered, in order to determine how to best address the problem (e.g., by repairing product 110 and attempting to re-attach a new part 410).

In many automated machine tools, in-process data is reported in a 2D format whenever a process is completed (e.g., whenever a rivet is installed). When the data is reported in a 2D format, it is impossible for external devices to accurately represent/visualize the operation in a 3D space. To address this issue with existing machine tools, in one embodiment a program or circuit is inserted into each machine tool in order to pull/intercept locally determined 3D coordinate information directly from a Numerical Control Program (NCP) at the machine tool as the machine tool is operating. For example, the program may be inserted into firmware governing the machine tool and used to report 3D coordinate information to external devices, such as controller 140.

Utilizing such a system ensures that instead of receiving sanitized and pre-processed positioning information from the machine tool (which may include, for example, only 2D coordinates instead of full 3D coordinates), the low-level raw data indicating the actual 3D movements of the machine tool are acquired for updating a 3D scene. In this manner, the system ensures that processes performed on the product are accurately represented in the 3D scene created by the controller.

Examples

In the following examples, additional processes, systems, and methods are described in the context of a manufacturing system at a factory that assembles aircraft fuselages by riveting a sheet metal skin onto the fuselage.

Figure 5:
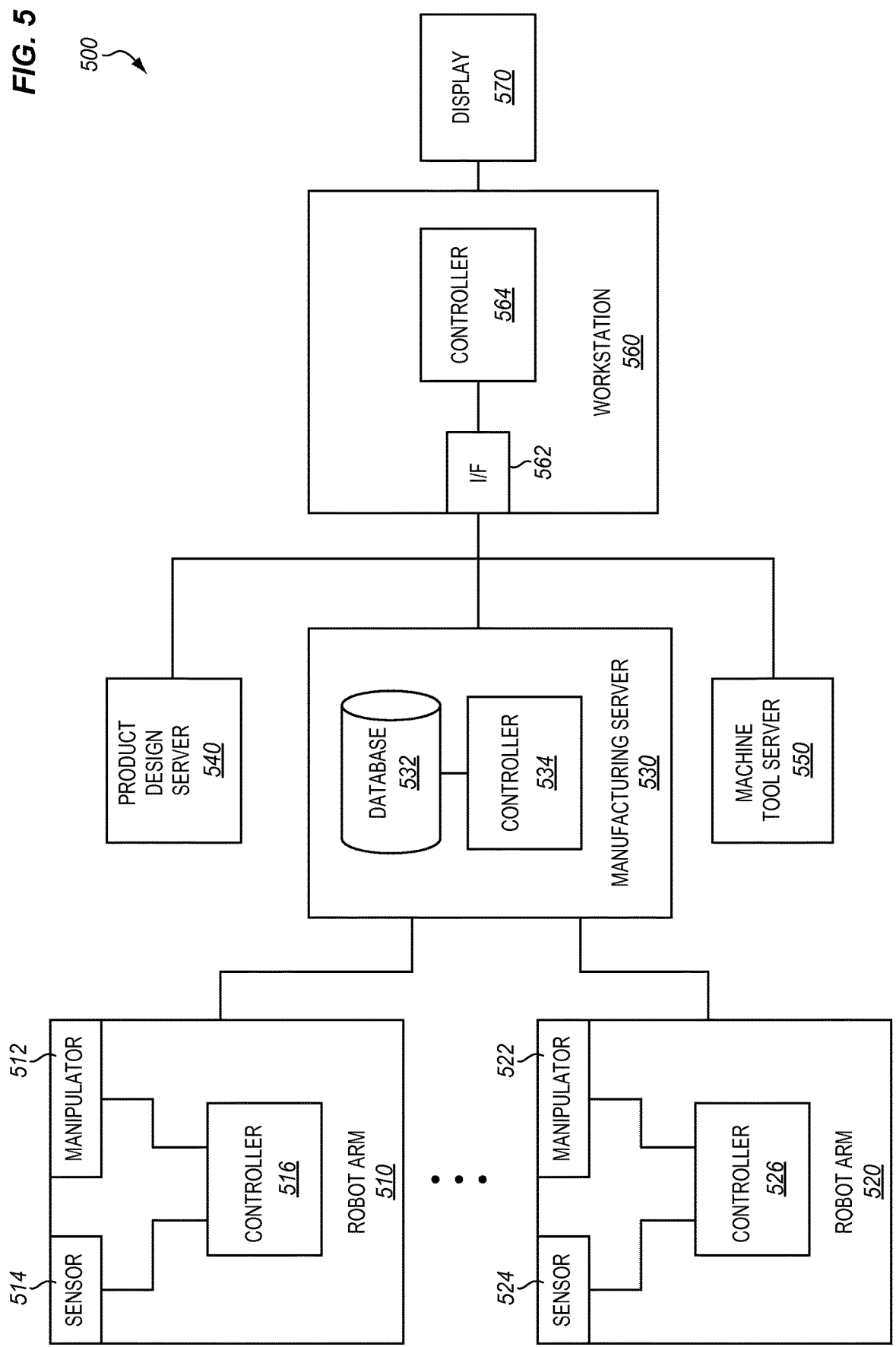
FIG. 5 is a block diagram illustrating a further exemplary manufacturing system in an exemplary embodiment.

FIG. 5 is a block diagram 500 illustrating a further exemplary manufacturing system in an exemplary embodiment. In this example, the manufacturing system implements an assembly cell with a pair of robot arms used for riveting. One arm is positioned outside of the fuselage and holds the rivet in place, while the other arm is positioned inside of the fuselage and applies a clamp force to fasten the rivet onto the fuselage. The two robot arms are depicted in FIG. 5 as elements 510 and 520. Each robot arm includes a manipulator (512, 522) for engaging in manufacturing processes for the fuselage, and also includes a sensor (514, 524) for detecting the position/orientation of each of its joints. A controller (516, 526) at each robot arm directs the operation of its corresponding manipulator, and based on input from its corresponding sensor determines how rivets have been attached to the fuselage.

Manufacturing server 530 periodically pulls updates from each robot arm. In this example, each update includes information for each installed rivet, in the form of six numbers (X, Y, Z, θ, Φ, Ψ) representing a 3D position and orientation of the rivet as it has been attached to the fuselage. Each update also includes similar information for each newly installed sheet of skin for the fuselage, as well as a 3D position and orientation of each movable component of the corresponding robot arm. Controller 534 therefore updates database 532 to accumulate entries for each newly attached rivet and sheet of skin.

While manufacturing server 530 is only depicted as communicating with robot arms in the current assembly cell, in this example manufacturing server 530 acquires and updates progress information from each assembly cell on the factory floor. Thus, manufacturing server 530 aggregates progress information from multiple cells within the factory. In this example, database 532 includes information for each assembly cell, indicating the location and orientation of each machine tool with respect to an in-process fuselage. This enables workstations at the factory to update and depict different assembly cells as desired by operators within the factory.

Manufacturing server 530, product design server 540, and machine tool server 450 are all coupled for communication with workstation 560 via a network connection. In this example, product design server 540 and machine tool server 550 are remotely located from the factory, but manufacturing server 530 and workstation 560 are located in the same building.

An operator of workstation 560 elects to determine the status of the assembly cell where riveting is taking place, and operates Ethernet interface 562 to acquire setup information for the assembly cell. Manufacturing server 530 then provides setup information indicating the position and orientation of the fuselage, as well as each machine tool of the assembly cell (in this case, the two robot arms). Manufacturing server 530 also indicates the model number of each machine tool in the assembly cell, as well as a reference number indicating the type of rivets being attached, a reference number indicating the type of sheets of skin being attached to the fuselage by the rivets, and a reference number indicating the type of fuselage frame to which the skin is being attached.

Controller 564, upon acquiring this information, contacts product design server 540 to acquire a 3D model of the rivet, the fuselage, and the fuselage skin, and further contacts machine tool server 550 to acquire 3D models for the robot arms being used in the assembly cell. Controller 564 then utilizes the position and orientation data provided by manufacturing server 530 to place each 3D object in an integrated scene. Once the scene has been set up, controller 564 operates Ethernet interface 562 to acquire updates for the scene as they are provided by the robot arms to database 532.

Specifically, controller 564 acquires updates via manufacturing server 530 indicating the position and orientation of each rivet and sheet of skin successfully attached to the fuselage, and updates the 3D scene with new models placed in the corresponding locations and orientations on the fuselage. In this manner, the operator enjoys the benefit of watching a 3D model of the fuselage assemble in real time. Controller 564 further updates the position and rotation the robot arms, based on their reported 3D positions and orientations.

FIG. 6 is a diagram 600 illustrating an update 610 in an exemplary embodiment. In this embodiment, the update provided by the machine tool includes numerous parameters, including the name of a "job" currently being worked on by the machine tool, an identifier for the machine tool, a date/time stamp, and a program name. The program name indicates the name of the program that governs the operations of the machine tool as it modifies this product. The program may therefore vary depending on the type of product being manipulated by the machine tool, new firmware updates, etc.

A line number is also included, indicating which line of code is currently being executed by a Numerical Control program for the machine tool. To further illustrate its progress, the machine tool also reports the exact hole number that it is riveting, a status indicator as to whether the operation for that hole succeeded or failed, and a 3D location (X, Y, Z) and rotation (A, B, C) in radians indicating the position and orientation of a rivet applied to the hole.

In this example, the update is acquired directly from internal components of the machine tool, and therefore the update indicates a position and orientation in the 3D space as defined by the local coordinate system used by the machine tool. To address this issue, a controller at manufacturing server 530 or workstation 560 transforms the local coordinates used by the machine tool into universal coordinates that are applicable to the 3D scene being depicted (e.g., by offsetting and/or rotating the coordinate from the machine tool, based on the coordinate system used to depict the scene).

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A system comprising:
a controller configured to generate a three dimensional (3D) scene depicting ongoing assembly of a product by a machine tool, wherein the scene includes a 3D model of the product and a 3D model of the machine tool, and the 3D models are placed within the scene based on a location of the product and a location of the machine tool; and
an interface configured to receive an update from the machine tool indicating a 3D placement of a part that has been attached by the machine tool to the product, the controller is configured to acquire a 3D model of the part, to insert the 3D model of the part within the scene based on the 3D placement, and to provide the scene for display to a user.

2. The system of claim 1, wherein:
the part comprises a fastener, the machine tool comprises a robot arm, and the 3D placement indicates a position and orientation of the part as attached to the product.

3. The system of claim 2, wherein:
the 3D placement comprises an X value, a Y value, and a Z value representing position, and a $\theta$ value, a $\Phi$ value, and a $\Psi$ value representing orientation.

4. The system of claim 1, wherein:
the controller is configured to receive updates from multiple machine tools that are assembling the product within an assembly cell, and to insert 3D models for parts within the scene based on the updates from the multiple machine tools.

5. The system of claim 1, wherein:
the controller is configured to determine, based on the update, that a manufacturing fault has been encountered by the machine tool, and to update the scene to represent the manufacturing fault.

6. The system of claim 1, wherein:
the update indicates a second 3D placement describing a movable component of the machine tool, and the controller is configured to update the 3D model of the machine tool based on the second 3D placement.

7. The system of claim 1, wherein:
the controller is configured to transform the 3D placement into a coordinate system used by the scene, and to insert the 3D model of the part at the transformed 3D placement.

8. The system of claim 1, wherein:
the update indicates tolerance information for the part.

9. The system of claim 8, wherein:
the update indicates tolerancing information for the part, and
the controller is configured to determine, based on the tolerance information, whether the part has been installed in an expected position and orientation, and to report a manufacturing fault to the user if the part has not been installed in the expected position and orientation.

10. A method comprising:
generating a three dimensional (3D) scene depicting ongoing assembly of a product by a machine tool, wherein the scene includes a 3D model of the product and a 3D model of the machine tool, and the 3D models are placed within the scene based on a location of the product and a location of the machine tool;
receiving an update from the machine tool indicating a 3D placement of a part that has been attached by the machine tool to the product;
acquiring a 3D model of the part;
inserting the 3D model of the part within the scene based on the 3D placement of the part; and
providing the scene for display to a user.

11. The method of claim 10, wherein:
the part comprises a fastener, the machine tool comprises a robot arm, and the 3D placement indicates a position and orientation of the part as attached to the product.

12. The method of claim 11, wherein:
the 3D placement comprises an X value, a Y value, and a Z value representing position, and a $\theta$ value, a $\Phi$ value, and a $\Psi$ value representing orientation.

13. The method of claim 10, further comprising:
receiving updates from multiple machine tools that are assembling the product within an assembly cell; and
inserting 3D models for parts within the scene based on the updates from the multiple machine tools.

14. The method of claim 10, further comprising:
determining, based on the update, that a manufacturing fault has been encountered by the machine tool; and
updating the scene to represent the manufacturing fault.

15. The method of claim 10, wherein:
the update indicates a second 3D placement describing a movable component of the machine tool, and the method further comprises:
updating the 3D model of the machine tool based on the second 3D placement.

16. The method of claim 10, further comprising:
transforming the 3D placement into a coordinate system used by the scene; and
placing the 3D model of the part at the transformed 3D placement.

17. The method of claim 10, wherein:
the update indicates tolerance information for the part.

18. The method of claim 17, wherein the method further comprises:
determining, based on the tolerance information, whether the part has been installed in an expected position and orientation; and
reporting a manufacturing fault to the user if the part has not been installed in the expected position and orientation.

19. An apparatus comprising:
a machine tool configured to assemble a product by attaching parts to the product, wherein the machine tool comprises:
a controller configured to detect 3D placements of parts that have been attached to the product by the machine tool, and to generate updates that each include a detected 3D placement of a part attached to the product by the machine tool; and
an interface configured to transmit the updates to an external device.

20. The apparatus of claim 19, wherein:
the controller is configured to include tolerancing information in each update indicating a deviation of the part from an expected 3D position and orientation.

* * * * *